United States Patent [19]
Khan

[11] Patent Number: 6,100,968
[45] Date of Patent: Aug. 8, 2000

[54] METHOD FOR DETERMINING WAVEGUIDE FACET REFLECTIVITY

[75] Inventor: Mujibun Nisa Khan, Holmdel, N.J.

[73] Assignee: Lucent Technologies Inc., Murray Hill, N.J.

[21] Appl. No.: 09/156,306

[22] Filed: Sep. 17, 1998

[51] Int. Cl.$^7$ ...................................................... G02B 6/30
[52] U.S. Cl. ................................ 356/73.1; 385/49; 385/50
[58] Field of Search ............................... 356/73.1; 385/49, 385/31, 39, 50

[56] References Cited

U.S. PATENT DOCUMENTS

| 4,102,559 | 7/1978 | Hunzinger | 385/49 |
| 5,875,274 | 2/1999 | Stein | 385/49 |

OTHER PUBLICATIONS

M. N. Khan, J. E. Zucker, T. Y. Chang, N. J. Sauer, and H. M. Presby, "Low Coupling Loss between Quantum Well Electron Transfer Waveguide Modulator and Single Mode Fiber," IEEE LEOS '94 Annual Meeting, Boston, MA, vol. 2, Nov., 1994, pp. 289–290.

J. Stone and L. W. Stulz, "Reflectance, transmittance, and loss spectra of multilayer $Si/SiO_2$ thin film mirrors and antireflection coatings for 1.5 $\mu$m," Applied Optics, vol. 9, No. 4, Feb. 1990, pp. 583–587.

*Primary Examiner*—Frank G. Font
*Assistant Examiner*—Tu T. Nguyen
*Attorney, Agent, or Firm*—Jeffery J. Brosemer

[57] ABSTRACT

A method for determining waveguide facet reflectivity from the electric field propagated from an optical fiber into an optical waveguide. The method determines the electric field propagated from the optical fiber into the optical waveguide by combining field terms resulting from multiple reflections occurring at an endface of the optical fiber and an input facet of the optical waveguide; determines the amount of optical field transmitted into the waveguide as a function of gap distance between the optical fiber and the waveguide; determines the optical power transmitted into the waveguide from the amount of field transmitted into the waveguide; and determines the waveguide facet reflectivity from the determined amount of optical power transmitted into the waveguide.

4 Claims, 3 Drawing Sheets

SCHEMATIC-FIBER-WAVEGUIDE POWER COUPLING

MEASURED TRANSMITTED POWER

CALCULATED TRANSMITTED POWER

500

600

METHOD FOR DETERMINING WAVEGUIDE FACET REFLECTIVITY

FIELD OF THE INVENTION

The present invention relates generally to the field of optical communications and in particular to a method for determining waveguide facet reflectivity.

BACKGROUND OF THE INVENTION

The efficient packaging and coupling of integrated waveguide devices with optical fibers is essential to the practical application of photonic integrated circuits. For low coupling loss, it is generally known that waveguide mode size should closely match the fiber mode size and that facets should include anti-reflective (AR) coatings. See, for example, M. N. Khan, J. E. Zucker, T. Y. Chang, N. J. Sauer, and H. M. Presby "Low Coupling Loss Between Quantum Well Electron Transfer Waveguide Modulator and Single Mode Fiber," *IEEE LEOS '94 Annual Meeting*, Boston, Mass., Vol. 2, pp. 289–290, November, 1994 and J. Stone and L. W. Stulz, "Reflectance, Transmittance and Loss Spectra of Multilayer of $Si/SiO_2$ Thin Film Mirrors and Anti-Reflection Coatings for 1.5 $\mu m$," *Applied Optics*, Vol. 9, No. 4, February 1990.

In practice, however, perfect mode-matching and AR coatings are very difficult to produce. Consequently, relatively high waveguide coupling losses are often encountered in packaged, optoelectronic devices, and in particular, Group III–IV semiconductor devices. From this discussion then, it is apparent that a continuing need exists for methods that enhance or facilitate the production of highly-efficient waveguide couplings and systems.

SUMMARY OF THE INVENTION

I have developed a method of determining waveguide facet reflectivity thereby facilitating the production of high-efficiency, low loss waveguide couplings and systems. The method determines the electric field propagated from the optical fiber into the optical waveguide by combining field terms resulting from multiple reflections occurring at an endface of the optical fiber and an input facet of the optical waveguide. Specifically, the method determines the amount of optical field transmitted into the waveguide as a function of gap distance between the optical fiber and the waveguide; determines the optical power transmitted into the waveguide from the amount of field transmitted into the waveguide; and determines the waveguide facet reflectivity from the determined amount of optical power transmitted into the waveguide extracts the reflectivity from a transmitted power measurement made through the waveguide.

DETAILED DESCRIPTION OF THE INVENTION

Figure 1:
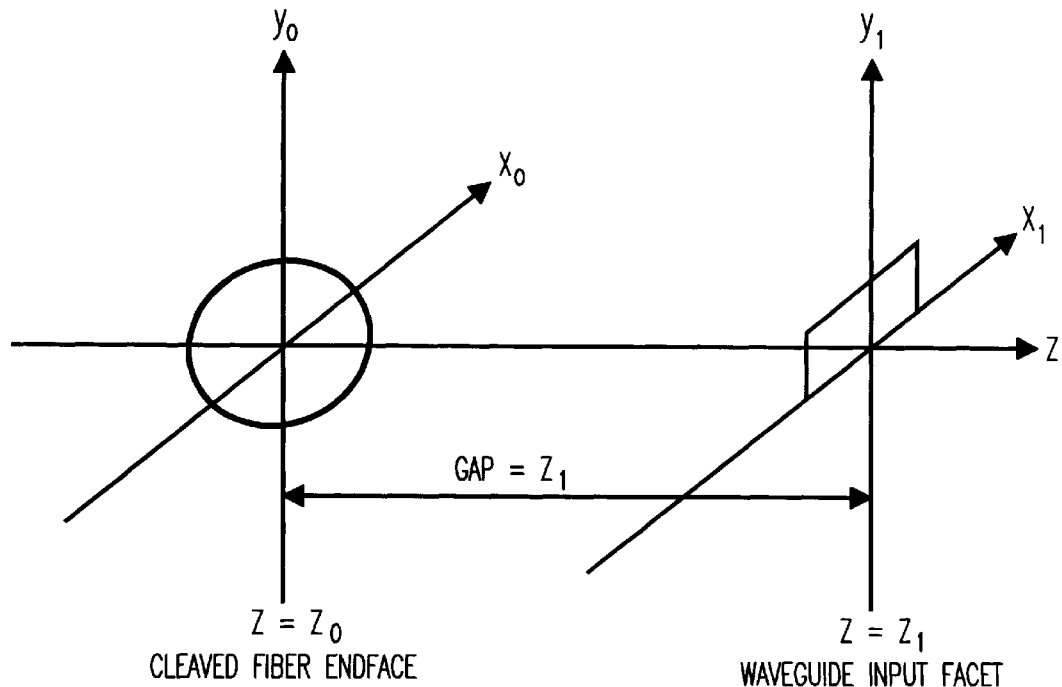
FIG. 1 is a schematic diagram of a fiber-waveguide coupling.

With initial reference now to FIG. 1 there is shown a schematic of a fiber-waveguide power coupling for a cleaved fiber endface 101 and a waveguide input facet 102 separated by a gap of distance $z_1$, 104. As can be noted by inspecting this Figure, a simple "0" and "1" coordinate system is used and the cleaved fiber endface 101 is positioned at $z=z_0$ and the waveguide input facet 102 is positioned at $z=z_1$.

Those skilled in the art will appreciate that modal power transmission from the fiber 101 to the waveguide facet 102 may be analyzed by propagating the electric field of an optical beam (not shown) traversing the fiber to the waveguide facet 102. Further, the 2-D fiber mode profile, $\psi(x,y)$, may be determined by solving the appropriate Bessel functions for the circular step-index fiber. Approximating the fiber field with a symmetric Gaussian, the propagated electric field $\psi(x,y,z_1)$, is found at the waveguide facet 102. At the facet 102, the total optical field, $\psi_T(x,y,z_1)$ emanating from the fiber facet 101 is determining by adding up all the field terms generated from multiple reflections at the "0" (z=0) and "1" (z=1) interfaces. Specifically, $$\psi_T(x,y,z_1)=t_0 t_1 \{\psi(x,y,z_1)+r_0 r_1 \psi(x,y,3z_1)+[r_0 r_1]^2 \psi(x,y,5z_1)+[r_0 r_1]^3 \psi(x,y,5z_1)+[r_0 r_1]^3 \psi(x,y,7z_1)+[r_0 r_1]^4 \psi(x,y9z_1)+ \ldots \} \quad [1]$$

where $t_0, t_1, r_0, r_1$ are transmission and reflection coefficients of the fiber and waveguide interfaces, respectively. The amount of field transmitted into the waveguide may be determined through the use of the overlap integral:

$$t = \int_{-\infty}^{\infty}\int_{-\infty}^{\infty} \psi_T(x, y, z_1) \phi^*(x, y) dx_1, dy_1, \quad [2]$$

where $\phi^*(x,y)$ is the waveguide field profile calculated according to the 2-D finite difference method known to those skilled in the art. Power transmitted into the waveguide is then found from the relationship $[n_{weff}/n_{feff}]|t|^2$.

Figure 2:
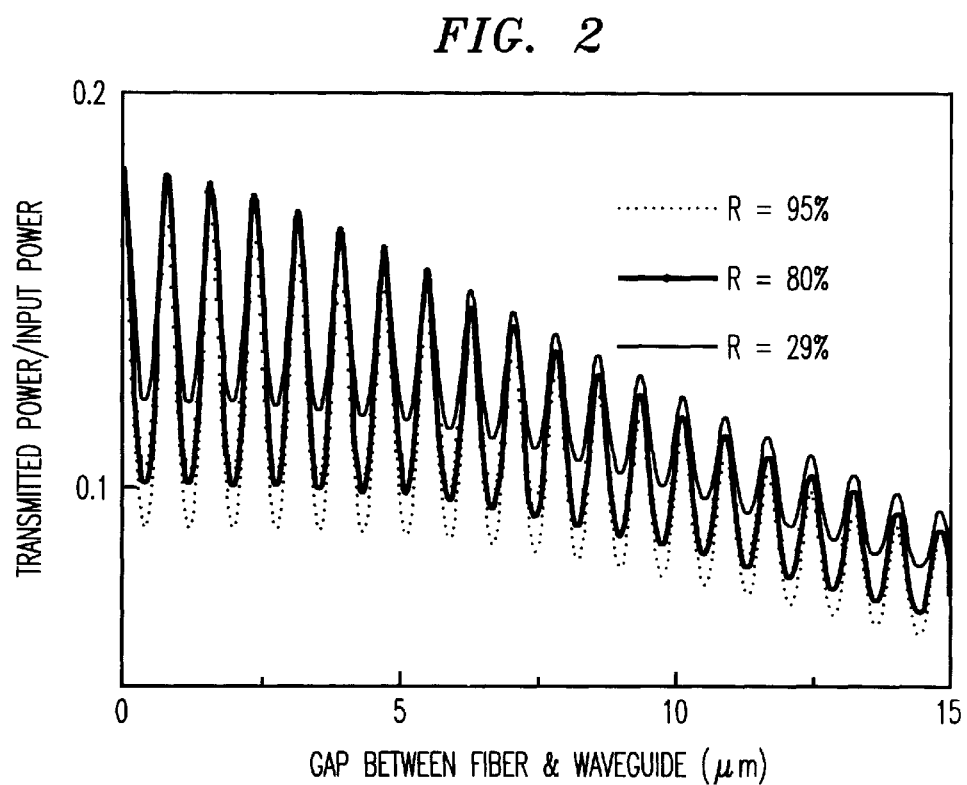
FIG. 2 is a graph showing the transmitted power/input power versus the gap between fiber and waveguide.

Using this treatment, the power transmitted from a standard single mode cleaved fiber into a 2.5 $\mu m$ wide and 1.6 $\mu m$ InP/InGaAsP rib waveguide, such as that suitable for electro-optical switches, was measured. With reference now to FIG. 2, there is shown the calculated transmitted power for three different reflectivities on the waveguide facet measured at a wavelength of 1.55 $\mu m$, with an air gap positioned between the fiber and the waveguide. As can be seen from this Figure, the optical power "rolls off" as a function of distance in the envelope, but the peak-valley ratios for a particular reflectivity remains constant.

In order to evaluate the method of the present invention, three different waveguide samples having input and output facets were coated with $Si/SiO_2$ thin films. The input facets of the samples R-388 and R-381 were coated to have reflectivities of ~95% and ~80%, respectively. The input facet of sample R-395 was not coated and therefore had a reflectivity of ~29%. All three samples had AR coatings on their respective output facet.

Light from a single-$\lambda$ laser source at 1.55 $\mu m$ was coupled into the waveguide on the samples using a single mode cleaved fiber. The input fiber was carefully aligned with the rib waveguide using a x,y,z positioner. Those skilled in the art will recognize that such positioners are well known and available from a number of manufacturers, i.e., Physik Instrumente. Angular tilts were minimized by monitoring Lloyd fringes observed in an IR camera positioned at the output of the waveguide. A Physik Instrumente, Model 277.30 HV PZT driver was used with a PZ E-250 D/A converter, to scan the fiber position from the guide facet along the propagation direction. The PZT driver was triggered with a voltage source to scan the voltage from 0–6V and the corresponding position values (in $\mu$m) from a conversion factor. The resolution of the PZT system was ~0.01 $\mu$m and the light transmitted through the waveguide was carefully detected from the output facet using a suitable lensed fiber. The fiber-waveguide gap was small yet still had an unknown, finite value.

Figure 3:
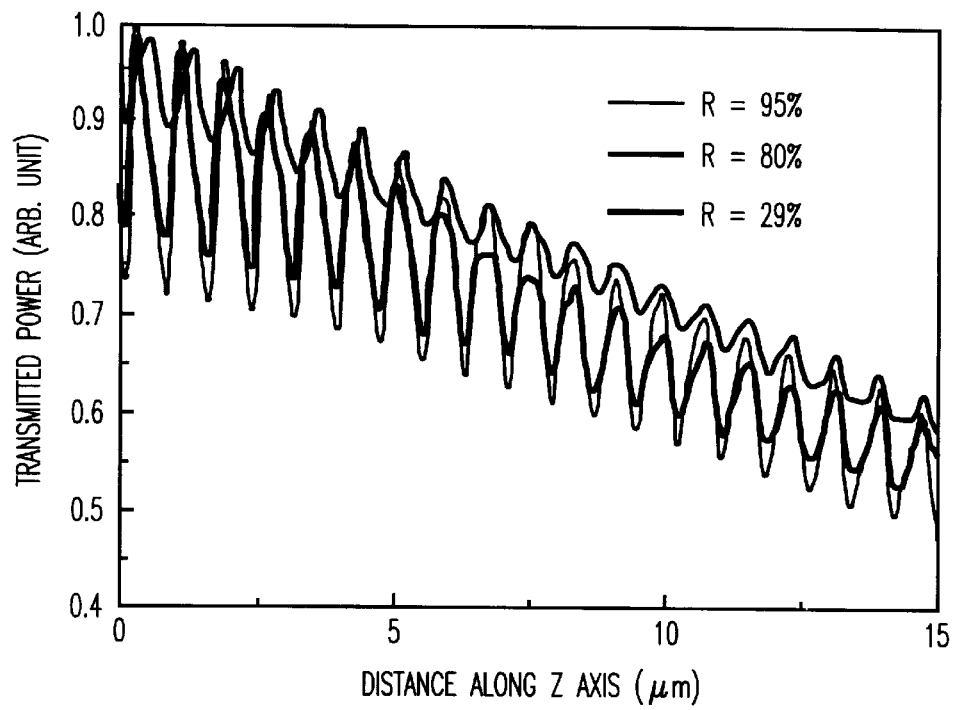
FIG. 3 is a graph showing the transmitted power versus distance along Z axis.

FIG. 3 shows the power measurement data taken for the three samples. The peak-valley ratios for the samples were constant and the power roll off behavior is similar to that calculated in FIG. 2. The peak-valley rations of samples R-388, R-381 and R-395 are 1.3837, 1.2795, and 1.1306 corresponding to 1.4030, 1.341 and 1.2182 of those calculated for 95%, 80% and 29%, respectively. This translates to a mismatch of only 1.4%, 4.6% and 7.0% for the three samples respectively which are well within the experimental errors of the Si/SiO2 thin film thickness and refractive indices that produce the desired reflectivity.

Figure 4:
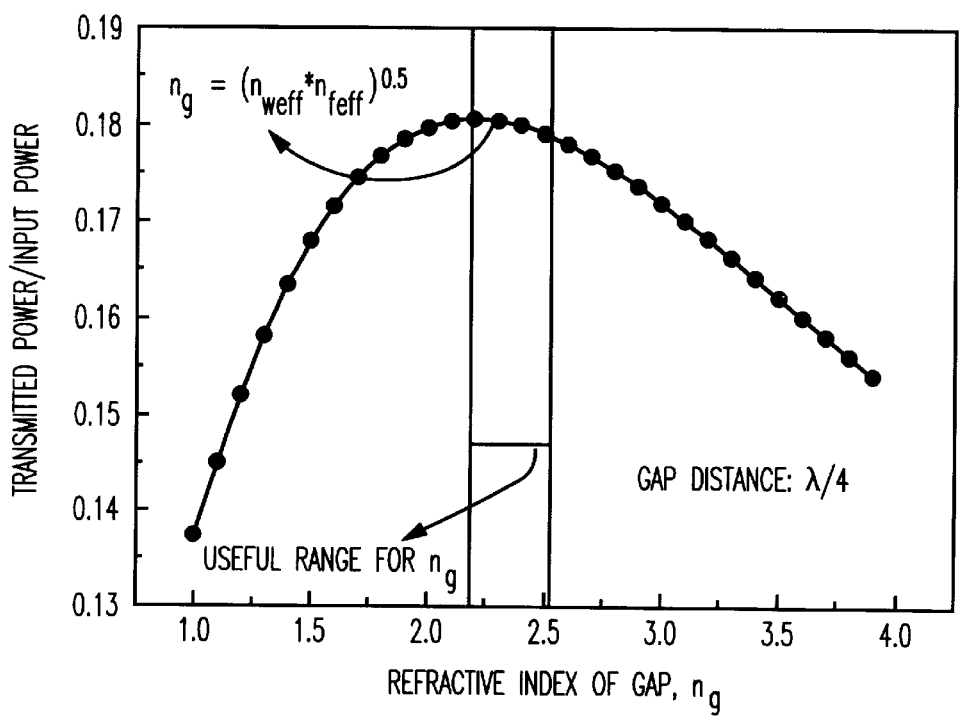
FIG. 4 is a graph showing the transmitted power versus calculated transmitted power.

Finally, those skilled in the art will appreciate if a suitable fluid having a refractive index of ~2.2 is combined with my inventive method for measuring reflectivity and coupling loss, the calculated transmitted input power shown as a maximum in FIG. 4 may be realized.

Figure 5:
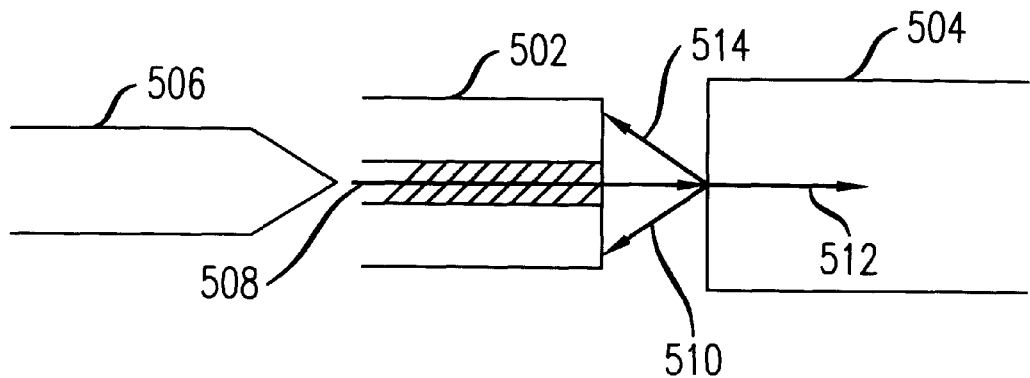
FIG. 5 is a block diagram showing facet reflectivity measurement according to the present invention.
Figure 6:
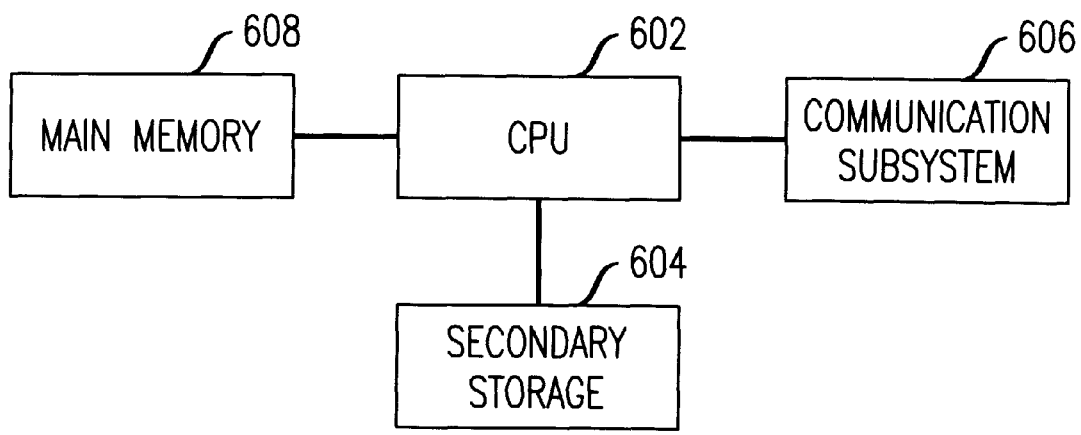
FIG. 6 is a block diagram illustrating a computer system suitable for practicing the method of the present invention.

FIG. 5 depicts in block diagram form the experimental measurement of facet reflectivity which is the subject of the present invention. Specifically, light 508 traversing optical fiber 502 exits the fiber, traverses gap 514 and then is injected into an input facet of waveguide 504 through which it is ultimately guided 512. As should now be apparent, multiple reflections 510 will occur as a result of the imperfect matching between the fiber 502 and the waveguide 504. These reflections are partially retransmitted through fiber 502 where they may be detected by detection fiber 506. This experimental configuration, in conjunction with the Of course, the method may be advantageously practiced with any of a number of known computing devices such as personal computers or workstations, a block diagram of which is shown in FIG. 6.

The elements, features, steps and procedures described herein are intended to illustrate the preferred embodiments of the present invention, and are not to be regarded as limiting the scope of the invention. Accordingly, changes may be made in the combination and arrangement of the various elements, features, steps and procedures described herein without departing from the spirit and scope of the invention.

The invention claimed is:

1. A computer-implemented method for determining waveguide facet reflectivity in a configuration in which optical power emanating from an endface of an optical fiber enters an input facet of an optical waveguide wherein the endface of the optical fiber and the input facet of the waveguide are separated by a gap, said method comprising the steps of:

first, determining a total optical field $\psi_T(x,y,z_1)$ emanating from the optical fiber by combining field terms resulting from multiple reflections occurring at optical fiber endface and the optical waveguide input facet, where x,y and $z_1$ are the coordinates of the optical waveguide input facet, second, determining the amount of optical field transmitted into the waveguide as a function of gap distance between the optical fiber and the waveguide;

third, determining the optical power transmitted into the waveguide from the amount of field transmitted into the waveguide; and fourth, determining the waveguide facet reflectivity from the determined amount of optical power transmitted into the waveguide.

2. The method according to claim 1 wherein the total optical field $\psi_T(x,y,z_1)$ emanating from the optical fiber is determined from the following relationship:

$$\psi_T(x,y,z_1) = t_0 t_1 \{\psi(x,y,z_1) + r_0 r_1 \psi(x,y,3z_1) + [r_0 r_1]^2 \psi(x,y,5z_1) + [r_0 r_1]^3 \psi(x,y,5z_1) + [r_0 r_1]^3 \psi(x,y,7z_1) + [r_0 r_1]^4 \psi(x,y9z_1) + \ldots \}; \quad [1]$$

where $t_0, t_1, r_0\ r_1$ are transmission and reflection coefficients of the fiber and waveguide interfaces, respectively.

3. The method according to claim 2 wherein the amount of field transmitted into the waveguide is determined according to the relationship:

$$t = \int_{-\infty}^{\infty} \int_{-\infty}^{\infty} \psi_T(x, y, z_1) \phi^*(x, y) dx_1, dy_1,$$

where $\phi^*(x,y)$ is the waveguide field profile calculated according to the 2-D finite difference method.

4. The method according to claim 3 wherein the power transmitted into the waveguide is determined according to the following relationship:

$$[n_{weff}/n_{feff}]|t|^2;$$

where $n_{weff}/n_{feff}$ is the refractive index of the waveguide and fiber, respectively.

* * * * *